United States Patent [19]

Venkatasetty

[11] 4,279,973

[45] Jul. 21, 1981

[54] ELECTROCHEMICAL CELL

[75] Inventor: Hanumanthiya V. Venkatasetty, Burnsville, Minn.

[73] Assignee: Honeywell Inc., Minneapolis, Minn.

[21] Appl. No.: 139,933

[22] Filed: Apr. 14, 1980

[51] Int. Cl.$^3$ .............................................. H01M 6/14
[52] U.S. Cl. ..................................... 429/101; 429/196
[58] Field of Search ............... 429/101, 191, 194, 196, 429/197

[56] References Cited

U.S. PATENT DOCUMENTS

| | | | |
|---|---|---|---|
| 4,074,019 | 2/1978 | Malachesky et al. | 429/191 |
| 4,075,397 | 2/1978 | Francis et al. | 429/191 |
| 4,170,693 | 10/1979 | Catanzarite | 429/101 |
| 4,177,329 | 12/1979 | Dey et al. | 429/196 |

*Primary Examiner*—Donald L. Walton
*Attorney, Agent, or Firm*—Albin Medved

[57] ABSTRACT

A high rate electrochemical cell comprising a lithium anode and a cathode using a depolarizer, thionyl chloride with an electrolyte. The depolarizer thionyl chloride has an electrolyte of aluminum chloride dissolved in it, and a conductivity increasing amount of gallium chloride.

6 Claims, No Drawings

ELECTROCHEMICAL CELL

BACKGROUND OF THE INVENTION

Because of the high electrical potential between lithium anodes in thionyl chloride depolarizers and carbon or metal cathodes, there is a great interest in batteries using these materials. Aluminum chloride is particularly attractive for high rate batteries. However, lithium/thionyl chloride batteries employing aluminum chloride have been found to be unacceptable in some instances because of the low conductance of the electrolyte solution and the high corrosive nature of the acidic solution. If the aluminum chloride solutions of thionyl chloride could be modified to have improved conductivity, far greater acceptance of this electrolyte cell would be realized.

DESCRIPTION OF THE INVENTION AND PREFERRED EMBODIMENT

It has now been discovered that electrochemical cells having a lithium anode and a cathode with a depolarizer electrolyte of an electrolyte amount of aluminum chloride dissolved in thionyl chloride can be improved so as to have substantially higher conductivity. The invention relates to the use of a conductivity increasing amount of gallium chloride in the above described electrochemical cell. Normally, this amount of gallium chloride measures from about 0.1 mole per liter of solution to 0.9 mole per liter. Preferred is from about 0.2 mole to about 0.5 mole per liter of electrolyte solution.

A number of other "chlorides" were evaluated to determine the effect of the additives on the conductivity of aluminum chloride dissolved in thionyl chloride. Essentially no improvement was noticed. Summarized below in Table 1 are the results of these experiments.

TABLE 1

| ADDITIVE | AMT (moles per liter) | CONDUCTIVITY × $10^{-4}$ ohm$^{-1}$cm$^{-1}$ |
|---|---|---|
| — | — | 2.1 |
| $GaCl_3$ | 0.1 | 7.0 |
| $GaCl_3$ | 0.2 | 12.8 |
| $GaCl_3$ | 0.3 | 18.2 |
| $GaCl_3$ | 0.4 | 22.9 |
| $GaCl_3$ | 0.5 | 27.5 |
| $FeCl_3$ | 0.5 | 7.3 |
| $InCl_3$ | 0.5 | 2.1 |
| $SbCl_3$ | 0.5 | 2.1 |
| $TiCl_4$ | 0.5 | 2.1 |
| $TiCl$ | 0.5 | 2.1 |

Having thus described the invention, what is claimed is:

1. A high rate electrochemical cell, comprising:
   a lithium anode;
   a cathode and a depolarizer electrolyte of an electrolyte amount of aluminum chloride dissolved in thionyl chloride; and
   a conductivity increasing amount of gallium chloride.

2. The cell of claim 1 wherein the amount of gallium chloride ranges from 0.1 mole to 0.9 mole per liter of electrolyte.

3. The cell of claim 2 wherein the amount of gallium chloride ranges from 0.2 mole to 0.5 mole per liter of electrolyte.

4. In an electrochemical cell having a lithium anode, a depolarizer electrolyte solution comprising an electrolytic amount of aluminum chloride dissolved in thionyl chloride, the improvement comprising;
   a conductivity increasing amount of gallium chloride.

5. The cell of claim 4 wherein the amount of gallium chloride ranges from 0.1 mole to 0.9 mole per liter of electrolyte.

6. The cell of claim 5 wherein the amount of gallium chloride ranges from 0.2 mole to 0.5 mole per liter of electrolyte.